(12) United States Patent
Ikeda et al.

(10) Patent No.: US 7,514,660 B2
(45) Date of Patent: Apr. 7, 2009

(54) FOCUSING APPARATUS, FOCUSING METHOD, AND INSPECTION APPARATUS

(75) Inventors: Masami Ikeda, Shizuoka (JP); Satoshi Endo, Shizuoka (JP)

(73) Assignee: NuFlare Technology, Inc., Numazu-shi (JP)

( * ) Notice: Subject to any disclaimer, the term of this patent is extended or adjusted under 35 U.S.C. 154(b) by 65 days.

(21) Appl. No.: 11/754,515

(22) Filed: May 29, 2007

(65) Prior Publication Data

US 2007/0280664 A1 Dec. 6, 2007

(30) Foreign Application Priority Data

May 30, 2006 (JP) ............................. 2006-149572

(51) Int. Cl.
*G02B 7/04* (2006.01)
*G03B 13/00* (2006.01)
(52) U.S. Cl. .................. 250/201.2; 250/201.4; 396/82; 348/354
(58) Field of Classification Search ... 250/201.2–201.5, 250/548; 348/345, 350, 354; 396/79, 82, 396/114, 133
See application file for complete search history.

(56) References Cited

U.S. PATENT DOCUMENTS 7,095,443 B2 * 8/2006 Yoshikawa .................. 348/350

FOREIGN PATENT DOCUMENTS

JP 11-271597 10/1999

* cited by examiner

*Primary Examiner*—Kevin Pyo
(74) *Attorney, Agent, or Firm*—Oblon, Spivak, McClelland, Maier & Neustadt, P.C.

(57) ABSTRACT

A focusing apparatus includes a first sensor and a second sensor configured to receive an optical image of a target workpiece to be inspected and convert it photoelectrically, a first optical system configured to make the optical image be focused on the first sensor, a second optical system configured to branch the optical image from the first optical system and to make a branched optical image be focused on the second sensor, a focus detection part configured to input a first image signal photoelectrically converted by the first sensor and a second image signal photoelectrically converted by the second sensor and to detect a focus position of the optical image by using high frequency components of the first image signal and the second image signal, and a focus control part configured to control a focus of the first optical system based on the focus position detected by the focus detection part.

10 Claims, 12 Drawing Sheets

FOCUSING APPARATUS, FOCUSING METHOD, AND INSPECTION APPARATUS

CROSS-REFERENCE TO RELATED APPLICATION

This application is based upon and claims the benefit of priority from the prior Japanese Patent Application No. 2006-149572 filed on May 30, 2006 in Japan, the entire contents of which are incorporated herein by reference.

BACKGROUND OF THE INVENTION

1. Field of the Invention

The present invention relates to a focusing apparatus, a focusing method, and an inspection apparatus. For example, it relates to a pattern inspection apparatus that inspects defects of a pattern formed on a mask used for manufacturing semiconductors etc., and to a focusing mechanism or its method used in such an apparatus.

2. Description of Related Art

In recent years, with an increase in high integration and large capacity of large-scale integrated circuits (LSI), a critical dimension of a circuit required for semiconductor elements is becoming narrower and narrower. These semiconductor elements are manufactured by forming circuits by exposing and transferring a pattern onto a wafer by means of a reduced-magnification projection exposure apparatus (a stepper) for example, while using a master pattern (also called a mask or a reticle, and will be hereinafter called a mask) on which a circuit pattern is written, "drawn" or "formed".

An improvement in yield is crucial in manufacturing an LSI which requires a lot of manufacturing cost. However, as typified by 1 giga-bit DRAM (Random Access Memory), the precision of a pattern, which constitutes an LSI, has been changing from sub-microns to nanometers. One of the major factors that decrease the yield is a pattern-defect of a mask-pattern used in exposing and transferring an ultrafine pattern onto a semiconductor wafer by a photolithography technique. In recent years, with miniaturization of an LSI pattern written on a semiconductor wafer, dimensions, which have to be detected as a pattern defect, are becoming extremely small. Furthermore, inspection of the LSI pattern formed on the actually produced semiconductor wafer is also important, and the measurement to be detected is also becoming very small. Moreover, with development of multimedia, miniaturization of a pattern of a TFT (Thin Film Transistor) or the like formed on an LCD (Liquid Crystal Display) is advancing. Therefore, it is increasingly required that an extremely small pattern-defect should be inspected in a wide range. Therefore, a pattern inspection apparatus that inspects defects of a transfer mask used in manufacturing an LSI, a manufactured semiconductor wafer, a photomask used in manufacturing an LCD, etc. needs to be highly precise.

As to a conventional pattern inspection apparatus, it is well-known that an inspection is performed by comparing an optical image captured by photographing a pattern written on a target workpiece, "object", or "sample" to be inspected, such as a lithography mask, at a predetermined magnification ratio by using a magnifying optical system, and design data (design pattern data) or an optical image captured by photographing the same pattern on the target workpiece.

For example, the following is known as pattern inspection methods: "die to die inspection" that compares optical image data obtained by photographing identical patterns at different positions on the same mask, and "die to database inspection" that generates design image data, which is converted from the design data as image data, based on writing data (information on design pattern) obtained by converting CAD data used in writing a mask pattern into a format to be input into an inspection apparatus, and compares this generated design image data with optical image data serving as measurement data obtained by capturing an image of the pattern. In such an inspection method of the inspection apparatus, a target workpiece is placed on a stage to be scanned by light flux when the stage moves to perform inspection. The target workpiece is irradiated with light flux from a light source and an illumination optical system. The light transmitted through the target workpiece or reflected by the target workpiece is focused onto a sensor through the optical system. The image captured by the sensor is transmitted to a comparison circuit as measurement data. In the comparison circuit, after performing position alignment of the images, the measurement data is compared with reference data based on an appropriate algorithm. As a result of the comparison, when they are not in accordance with each other, it is judged there is a pattern defect.

In order to increase the preciseness of such a pattern inspection apparatus, it is required to obtain an optical image of large magnification and high resolution in capturing an image of a pattern on a target workpiece to be inspected, such as a mask. Thus, it becomes important to perform optimum focusing of the optical image.

FIG. 17 shows a focusing mechanism applying the conventional optical lever method. In FIG. 17, an optical image of a photographic subject W is focused onto a sensor 501 by an objective lens 502 and an imaging lens 503. In a focusing mechanism 500, the position in the focusing direction of the photographic subject W is focused on a position sensor 505 by using LD lights of an LD 504. A signal of the position sensor 505 is processed in a focus detection circuit 506, and a focus control circuit 507 calculates a focus displacement amount to control the focus.

In addition, a method is known in which front focus and back focus states of an image to be focused are formed, and the focus position is calculated based on a difference of integration values (contrast) of light intensity of the front focus state and the back focus state. (Refer to, e.g., Japanese Published Unexamined Patent Application No. 11-271597)

However, according to the focus detection of the optical lever method mentioned above, when a critical dimension or a pitch of a semiconductor pattern becomes below a wavelength of the illumination light used in the focus detection, a diffracted light is generated at the pattern to be focused on the position sensor. Consequently, there is a problem that the correct focus position may not be detectable. Moreover, in the case of using an integration value of light intensity, when a difference of integration values is small, there is a problem that the focus position may not be detected accurately.

SUMMARY OF THE INVENTION

It is an object of the present invention to provide a focusing apparatus and a focusing method by which highly precise measurement can be executed, and an inspection apparatus that includes such a focusing mechanism.

In accordance with one aspect of the present invention, a focusing apparatus includes a first sensor and a second sensor configured to receive an optical image of a target workpiece to be inspected and convert it photoelectrically, a first optical system configured to make the optical image be focused on the first sensor, a second optical system configured to branch the optical image from the first optical system and to make a branched optical image be focused on the second sensor, a focus detection part configured to input a first image signal photoelectrically converted by the first sensor and a second image signal photoelectrically converted by the second sensor and to detect a focus position of the optical image by using high frequency components of the first image signal and the second image signal, and a focus control part configured to control a focus of the first optical system based on the focus position detected by the focus detection part.

In accordance with another aspect of the present invention, an inspection apparatus includes a first sensor and a second sensor configured to receive an optical image of a target workpiece to be inspected and convert it photoelectrically, a first optical system configured to make the optical image be focused on the first sensor, a second optical system configured to branch the optical image from the first optical system and to make a branched optical image be focused on the second sensor, a focus detection part configured to input a first image signal photoelectrically converted by the first sensor and a second image signal photoelectrically converted by the second sensor and to detect a focus position of the optical image by using high frequency components of the first image signal and the second image signal, a focus control part configured to control a focus of the first optical system based on the focus position detected by the focus detection part, and a comparison part configured to compare the first image signal photoelectrically converted from the optical image focused and a predetermined reference image signal.

In accordance with another aspect of the present invention, a focusing method includes making an optical image of a target workpiece to be inspected be focused on a first sensor by using an optical system, converting the optical image focused on the first sensor photoelectrically, branching the optical image and making a branched optical image be focused on a second sensor, converting the optical image focused on the second sensor photoelectrically, inputting a first image signal photoelectrically converted by the first sensor and a second image signal photoelectrically converted by the second sensor and detecting a focus position of the optical image by using high frequency components of the first image signal and the second image signal, and controlling a position for focusing of the optical system based on the focus position detected.

DETAILED DESCRIPTION OF THE INVENTION

Embodiment 1

Figure 1:
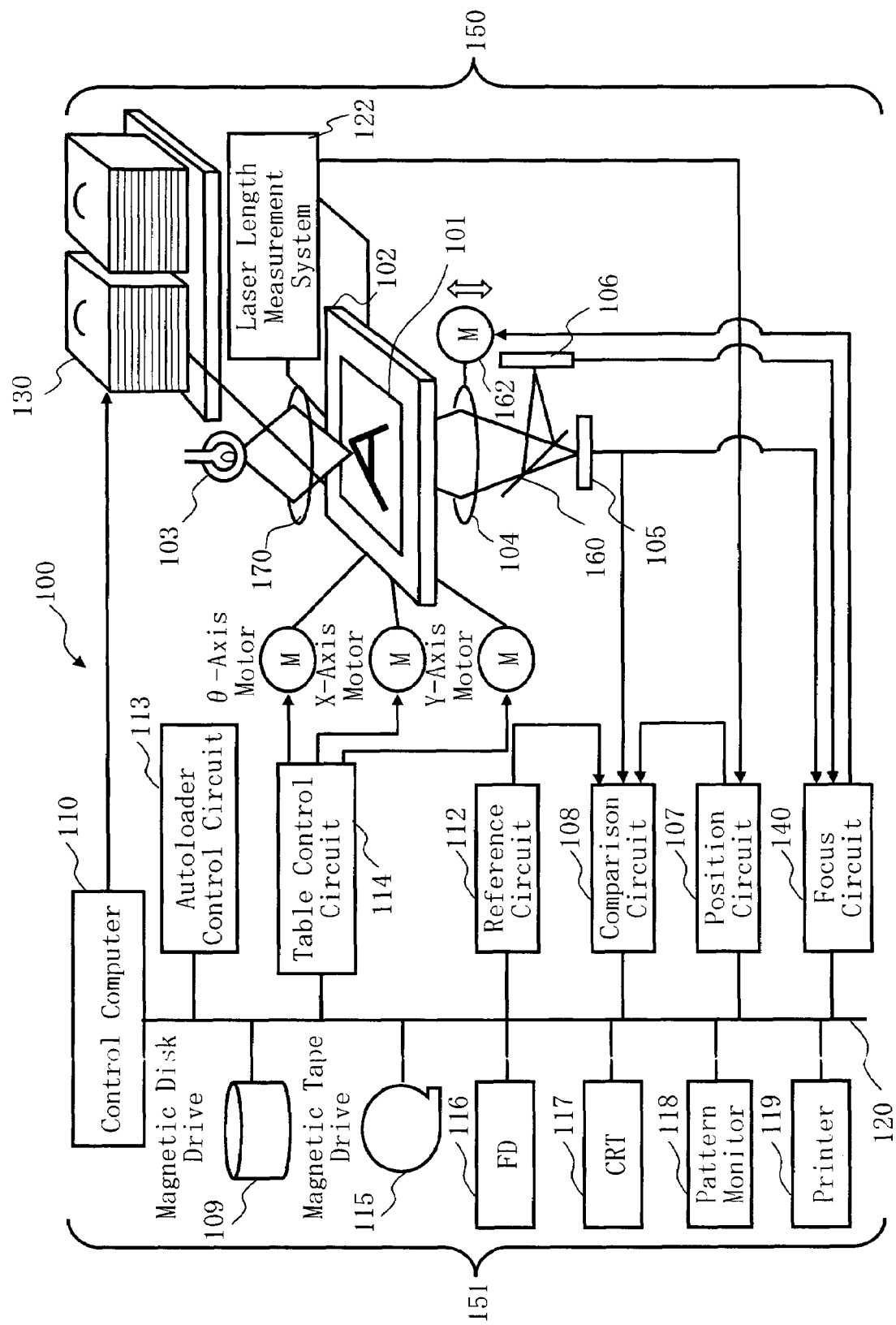
FIG. 1 is a schematic diagram showing the structure of a pattern inspection apparatus according to Embodiment 1.

FIG. 1 is a schematic diagram showing the structure of a pattern inspection apparatus described in Embodiment 1. In the figure, a pattern inspection apparatus 100 inspects a defect of a substrate, such as a mask or a wafer on which a pattern is formed, serving as a target workpiece to be inspected. The target workpiece inspection apparatus includes an optical image acquiring part 150 and a control system circuit 151. The optical image acquiring part 150 includes an XYθ table 102, a light source 103, a magnifying optical system 104 (an example of a first optical system), an inspection sensor 105 (an example of a first sensor), a focusing sensor 106 (an example of a second sensor), a half mirror 160 (an example of a second optical system), a laser length measurement system 122, an autoloader 130, and an illumination optical system 170.

In the control system circuit 151, a control computer 110 is connected, through a bus 120 serving as a data transmission path, to a position circuit 107, a comparison circuit 108 being an example of a comparison part, a reference circuit 112 being an example of a reference image generation part, a focus circuit 140, an autoloader control circuit 113, a table control circuit 114, a magnetic disk drive 109 being an example of a storage device, a magnetic tape drive 115, a flexible disk drive (FD) 116, a CRT 117, a pattern monitor 118, and a printer 119. The XYθ table 102 is driven by an X-axis motor, a Y-axis motor, and a θ-axis motor. Moreover, an objective lens (not shown) in the magnifying optical system 104 is driven by a servomotor 162. FIG. 1 depicts structure elements necessary for describing Embodiment 1, and other structure elements may be included in the pattern inspection apparatus 100.

Next, acquiring procedure of an optical image will be explained. The optical image acquiring part 150 acquires an optical image (measurement data) of a photomask 101. The photomask 101 serves as a target workpiece on which a figure represented by figure data included in design pattern data is drawn based on the design pattern data. More specifically, the optical image is acquired as follows:

The photomask 101 serving as a target workpiece to be inspected is placed on the XYθ table 102 which is movable in a horizontal direction and a rotating direction by the X-, Y-, and θ-axis motors. The pattern written on the photomask 101 is irradiated with lights from the appropriate light source 103 arranged above the XYθ table 102. The XYθ table 102 is driven by the table control circuit 114 under the control of the control computer 110. The XYθ table 102 can be moved by a drive system such as a three-axis (X-Y-θ) motor, which drives the XYθ table 102 in the X direction, the Y direction, and the θ direction. A step motor, for example, can be used as these X, Y, and θ motors. The movement position of the XYθ table 102 is measured by the laser length measurement system 122, and is supplied to the position circuit 107. The photomask 101 on the XYθ table 102 is automatically conveyed from the autoloader 130 driven by the autoloader control circuit 113, and is automatically ejected after the inspection. Light flux from the light source 103 irradiates the photomask 101 through the illumination optical system 170. Below the photomask 101, the magnifying optical system 104 and the inspection sensor 105 are arranged. The light transmitted through the photomask 101, such as an exposure mask, is focused on the inspection sensor 105 as an optical image by the magnifying optical system 104, and enters the inspection sensor 105.

A part of the optical image passing through the magnifying optical system 104 is branched by the half mirror 160, and a half of the light quantity is focused on the focusing sensor 106 by the half mirror 160 as an optical image, and enters the focusing sensor 106. The pattern image focused on the inspection sensor 105 is photoelectrically converted into an image signal (first image signal) by the inspection sensor 105. Similarly, the other half of the light quantity is focused on the focusing sensor 106 as an optical image, and enters the focusing sensor 106. The pattern image focused on the focusing sensor 106 is also photoelectrically converted into an image signal (second image signal) by the focusing sensor 106. The image signal photoelectrically converted by the inspection sensor 105 is sent to the focus circuit 140 in addition to being sent to the comparison circuit 108. That is, since the image signal photoelectrically converted by the inspection sensor 105 is sent to the focus circuit 140, the focus position is calculated in the focus circuit 140 as will be mentioned later, and the focus circuit 140 controls the automatic focusing mechanism including the servomotor 162. A focus adjustment (focus control) of the magnifying optical system 104 is automatically performed by the automatic focusing mechanism including the servomotor 162.

The measurement data (optical image) outputted from the inspection sensor 105 is sent to the comparison circuit 108, and the data indicating the position of the photomask 101 on the XYθ table 102, outputted from the position circuit 107 is also sent to the comparison circuit 108. The measurement data is no-code data of 8 bits for example, and expresses a gray level of luminance of each pixel.

Information on the design pattern which was used in forming the pattern of the photomask 101 is stored in the magnetic disk drive 109 being an example of a storage device (storage part). The reference circuit 112 reads the information on the design data from the magnetic disk drive 109 through the control computer 110. A reference image is created by performing suitable filter processing after converting the read design figure data, which is included in the design data as figure information, of the photomask 101 into image data of binary or more values.

As a comparing step, the comparison circuit 108 receives a measurement image signal which serves as measurement data of a pattern to be inspected, generated at the inspection sensor 105 based on a transferred image obtained from the photomask 101, and a reference image signal which serves as design image data, generated at the reference circuit 112, compares the signals, namely the measurement image signal and the reference image signal, based on a predetermined algorithm, and judges whether there is a defect or not. Then, the comparison circuit 108 outputs the result of the comparing.

Figure 2:
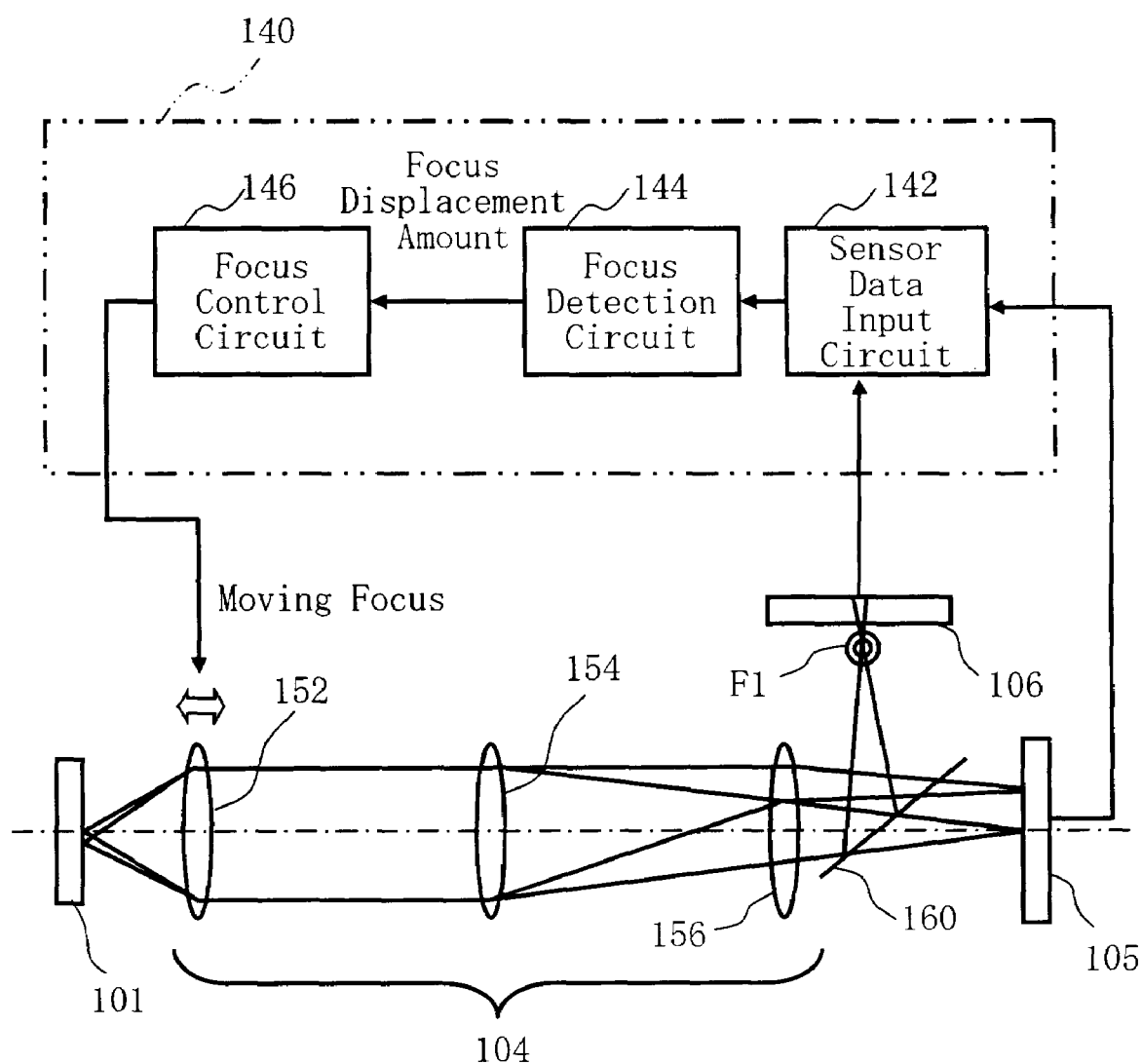
FIG. 2 is a schematic diagram showing the structure of a focusing mechanism according to Embodiment 1.

Next, the focusing method according to Embodiment 1 will be explained. FIG. 2 is a schematic diagram showing the structure of a focusing mechanism described in Embodiment 1. In the figure, the focusing mechanism (an example of a focusing apparatus) includes the magnifying optical system 104, the half mirror 160, the inspection sensor 105, the focusing sensor 106, and the focus circuit 140. The magnifying optical system 104 being an example of the first optical system includes an objective lens 152, an imaging lens 154, and an additional lens 156. The objective lens 152 is arranged to be opposite to the photomask 101 being a target workpiece to be inspected, for obtaining an enlarged image. The imaging lens 154 is arranged to be opposite to the objective lens 152, and makes the light from the objective lens 152 be focused on the inspection sensor 105. The additional lens 156 is arranged between the imaging lens 154 and the inspection sensor 105, and provides a telecentric optical system for the image forming side. By using the telecentric optical system, it is possible to make magnification ratios of the optical images focused by shifting the focus position be equivalent.

The half mirror 160 being an example of the second optical system is arranged between the additional lens 156 and the inspection sensor 105, and branches the optical image to be focused on the focusing sensor 106. In this case, an optical path length is set so that the focus position of the optical image focused on the focusing sensor 106 by the half mirror 160 may be a front focus position, meaning to have the focus at the front side, shown by F1, with respect to the optical image focused on the inspection sensor 105 by the imaging lens 154. However, it is not restricted to this, and the optical path length may be set so that the focus position of the optical image focused on the focusing sensor 106 by the half mirror 160 may be a back focus position, meaning to have the focus at the backside, with respect to the optical image on the inspection sensor 105. Since the half mirror 160 branches the optical image of the telecentric optical system at the image forming side, it is possible to make the magnification ratios of the optical images focused by shifting the focus position set by the half mirror 160 and the imaging lens 154 be equivalent. By making the magnification ratios of the optical images focused by shifting the focus position be equivalent, it becomes possible to make the size of the visual field of the image at the time of focus detection be the same.

As the inspection sensor 105 and the focusing sensor 106, it is preferable to use a line sensor, an accumulation type (Time Delay and Integration) sensor, or a two-dimensional area sensor. Particularly in the case of using the accumulation type sensor, by making the magnification ratios of the optical images focused by shifting the focus position be equivalent, it is possible to eliminate a synchronization gap between the optical image and the sensor scanning time, which is generated when optical magnification ratios are different.

The focus circuit 140 includes a sensor data input circuit 142, a focus detection circuit 144 (an example of a focus detection part), and a focus control circuit 146 (an example of a focus control part). The sensor data input circuit 142 inputs image signals from the inspection sensor 105 and the focusing sensor 106, and outputs a signal to the focus detection circuit 144. Then, the focus position is detected in the focus detection circuit 144. When the focus position is input into the focus control circuit 146 from the focus detection circuit 144, the focus control circuit 146 drives the servomotor 162 and moves the objective lens 152 to the focus position which is regarded as reference. Further, when performing inspection, the focus control circuit 146 drives the servomotor 162 to make the objective lens 152 move to the position which is offset by a predetermined offset value.

Figure 3:
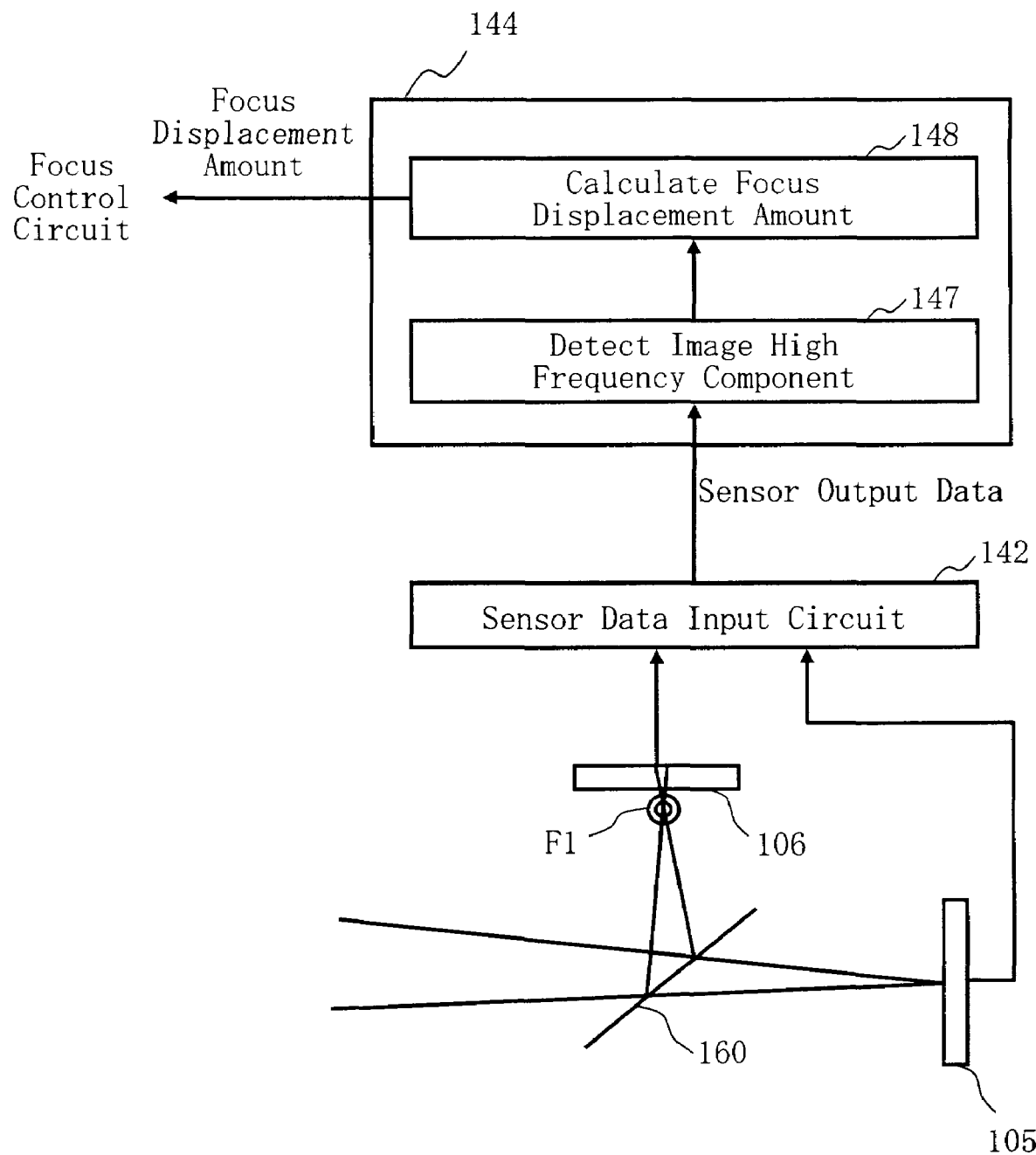
FIG. 3 shows a focusing mechanism according to Embodiment 1.

FIG. 3 shows a focusing mechanism described in Embodiment 1. When the focus detection circuit 144 receives sensor output data from the sensor data input circuit 142, a high frequency component detection circuit 147 as shown in FIG. 3 detects a high frequency component of the image. Based on the detected high frequency component of the image of the inspection sensor 105 and the detected high frequency component of the image of the focusing sensor 106, each focus evaluation value of the images is calculated to be compared with each other. A reference focus position, being a reference of the focus position, of the optical image on the inspection sensor 105 and a focus displacement amount required to be shifted to the reference focus position are calculated by a focus displacement amount calculation circuit 148. In the focus control circuit 146, the servomotor 162 is driven based on the focus position calculated by the focus detection circuit 144, to control the focus of the objective lens 152.

Figure 4:
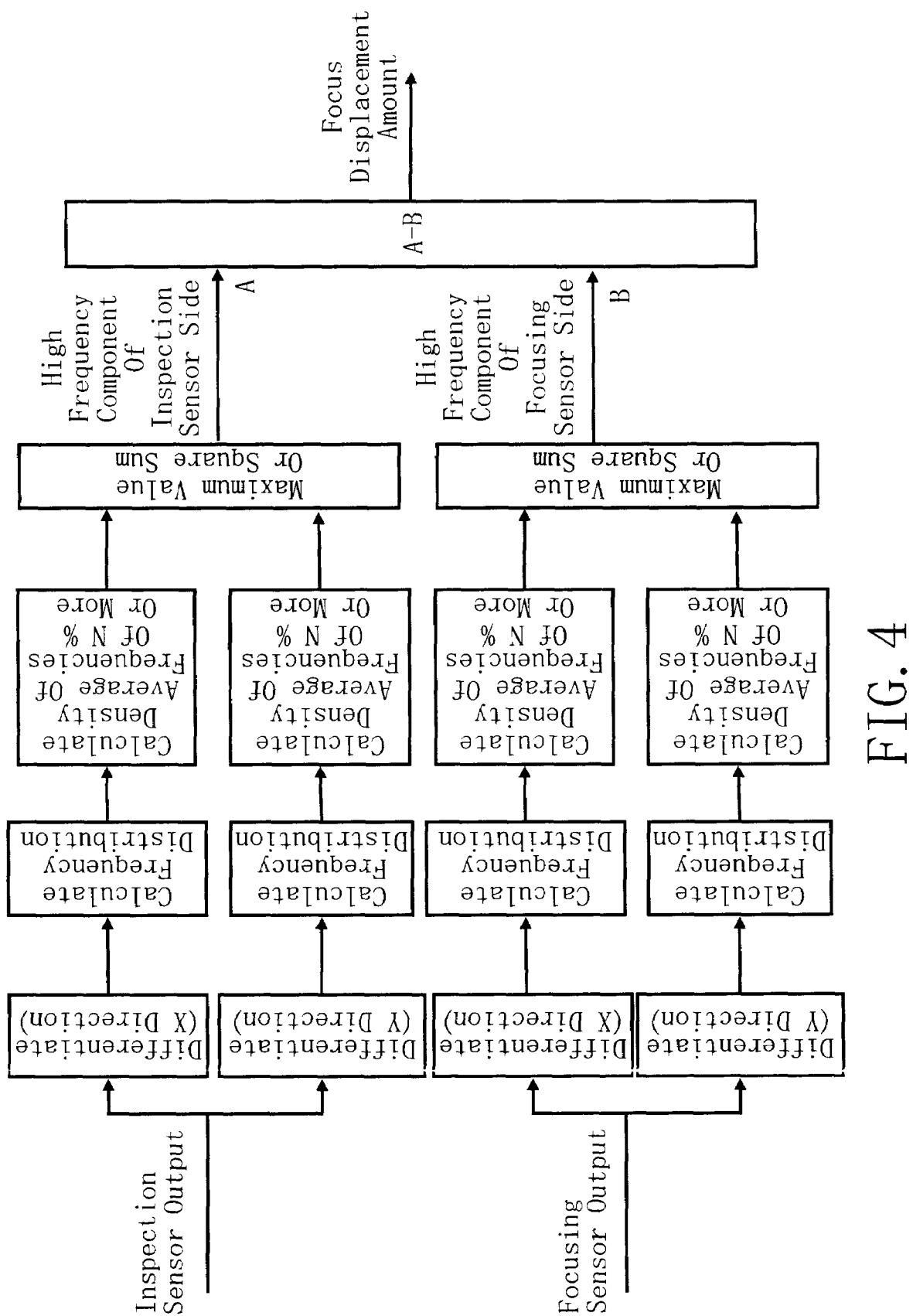
FIG. 4 is a block diagram showing contents of signal processing of a focus detection circuit according to Embodiment 1.

FIG. 4 is a block diagram showing contents of signal processing of the focus detection circuit described in Embodiment 1. In the high frequency component detection circuit 147 of the focus detection circuit 144, as shown in FIG. 4, a high frequency component of the image of the inspection sensor 105 and a high frequency component of the image of the focusing sensor 106 are detected. Then, a reference focus displacement amount can be calculated by comparing high frequency components of the image of the inspection sensor 105 and the image of the focusing sensor 106.

As shown in FIG. 4, as to the inputted image signal of the inspection sensor 105, the high frequency component detection circuit 147 performs differentiation with respect to the directions of X and Y respectively, and calculates frequency distribution and a density average of frequencies of N % or more. Then, by calculating a maximum value or a square sum of the density average, a high frequency component of the inspection sensor 105 side is output. Similarly, the high frequency component detection circuit 147 outputs a high frequency component of the focusing sensor 106 side. The focus displacement amount calculation circuit 148 outputs the difference between them as a focus displacement amount.

Figure 5:
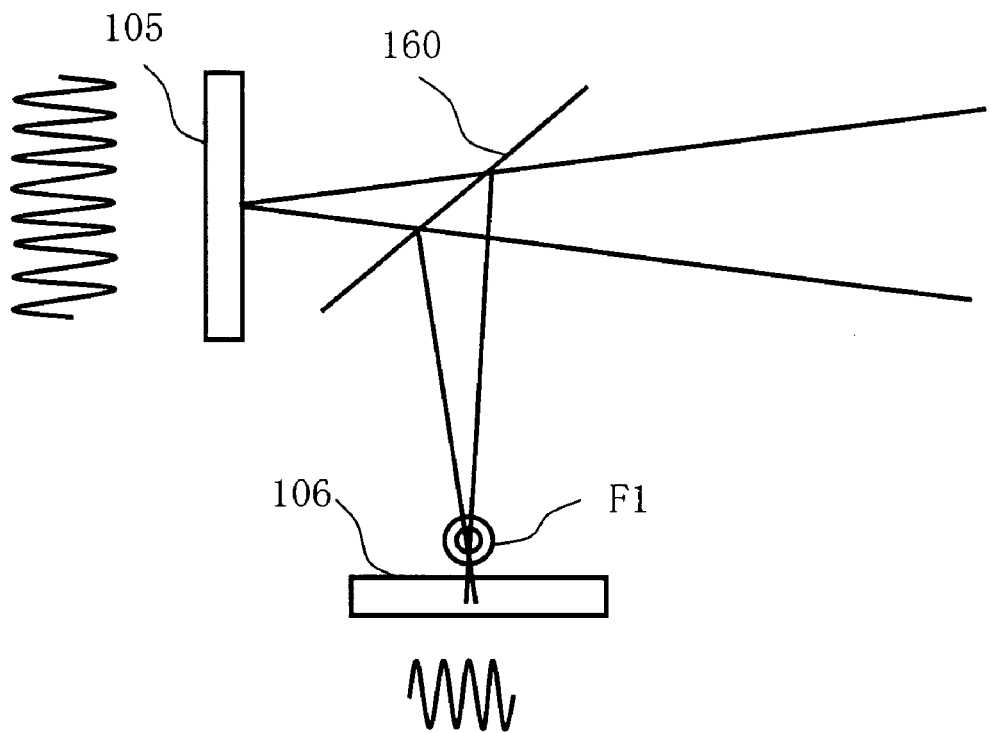
FIG. 5 shows an example of outputs of an inspection sensor and a focusing sensor according to Embodiment 1.

FIG. 5 is a diagram for explaining an example of outputs of the inspection sensor and the focusing sensor described in Embodiment 1. When an L/S pattern is focused on the inspection sensor 105 as an optical image, its identical optical image is focused on the front focus position of the focusing sensor 106. It shows the case in which the focus position of the focusing sensor 106 is at in the front focus side, and the sensor output amplitude of the inspection sensor 105 which is at the just focus position (focused focal point position) is larger than the sensor output amplitude of the focusing sensor 106 whose focus position is shifted.

Figure 6:
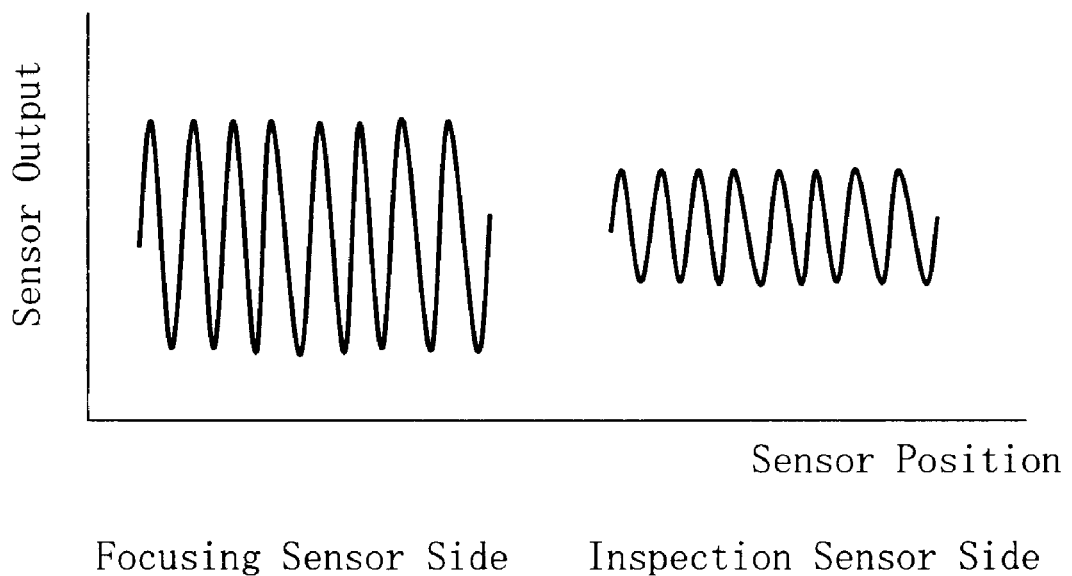
FIG. 6 shows an example of a sensor output according to Embodiment 1.
Figure 7:
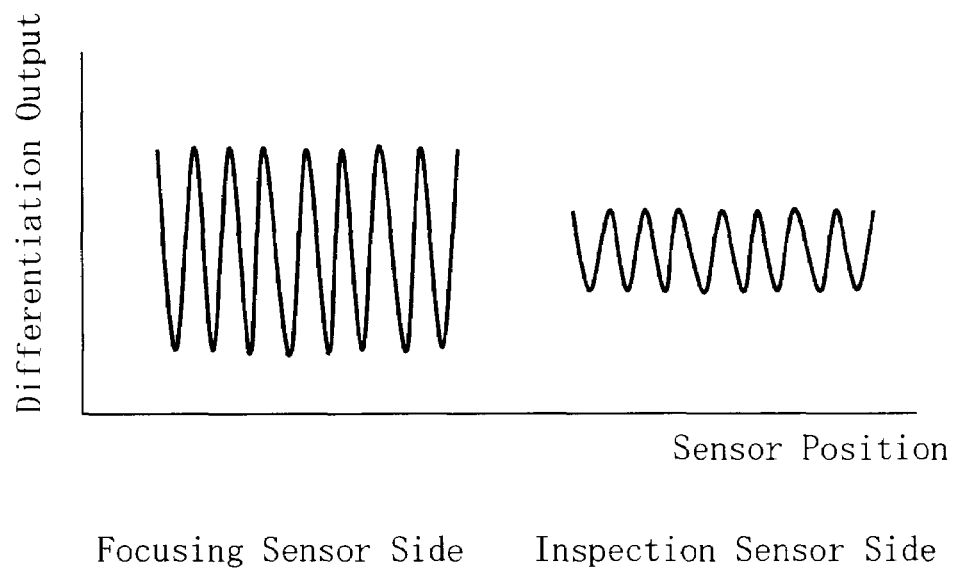
FIG. 7 shows an example of a differentiation output according to Embodiment 1.
Figure 8:
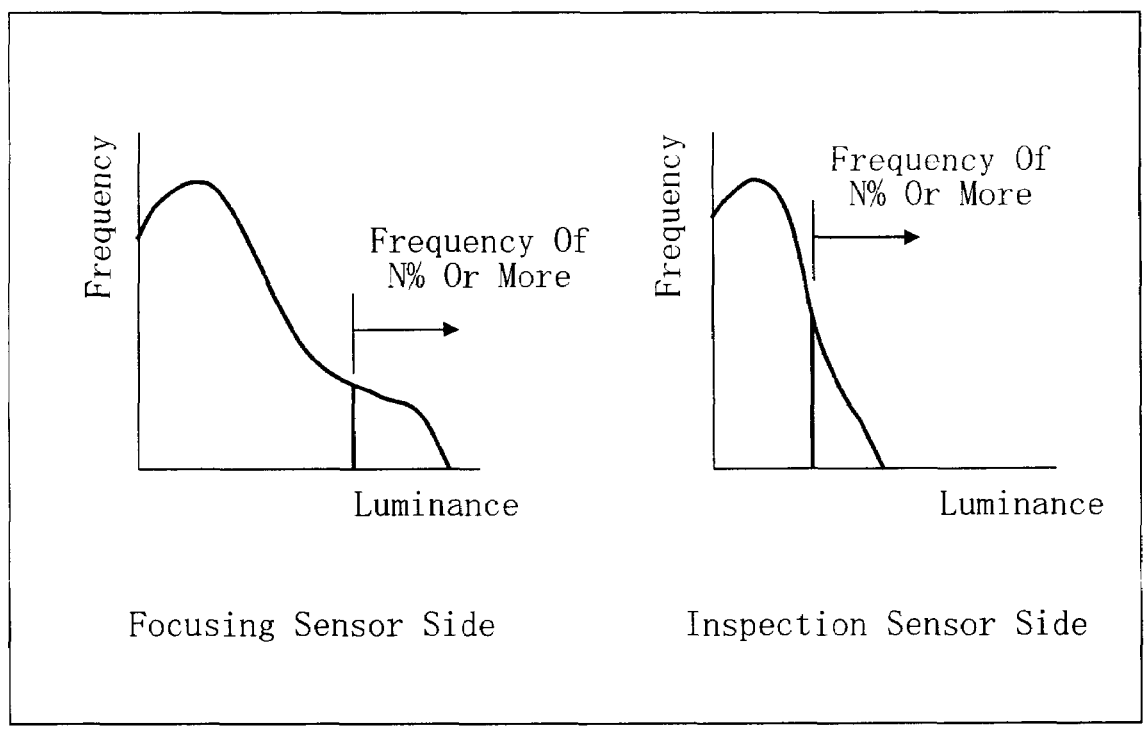
FIG. 8 shows an example of a relation between luminance and frequency according to Embodiment 1.

FIG. 6 shows an example of the sensor output described in Embodiment 1. FIG. 7 shows an example of the differentiation output described in Embodiment 1. FIG. 8 shows an example of the relation between luminance and frequency described in Embodiment 1.

FIGS. 6-8 show the cases in which the focus position of the focusing sensor 106 is at the just focus position. That is, it shows the case in which the focus position of the inspection sensor 105 is at the front focus side. In this case, the sensor output amplitude of the focusing sensor 106 is larger than that of the inspection sensor 105, and the differentiation output signal of the focusing sensor 106 is also larger than that of the inspection sensor 105. Therefore, with respect to frequency distribution of the differentiation output signal, the luminance part distribution of the focusing sensor 106 side is larger than that of the inspection sensor 105 side. When calculating the average value of luminance of frequencies of N % or more, the value of the focusing sensor 106 side is larger than that of the inspection sensor 105 side.

Figure 9:
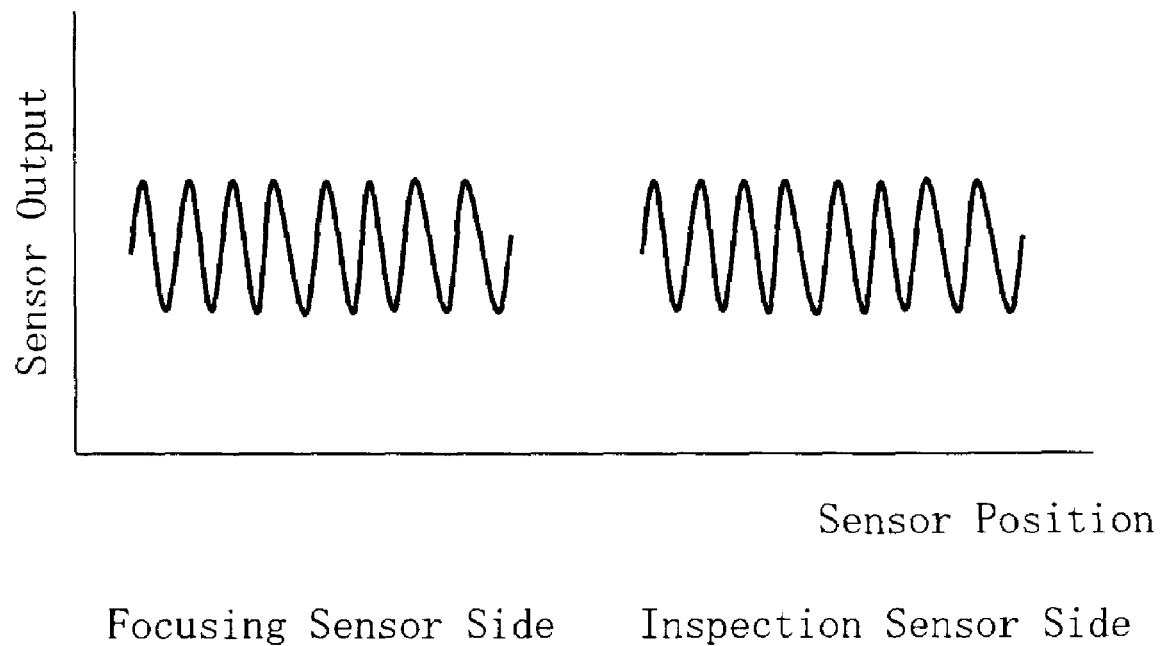
FIG. 9 shows another example of a sensor output according to Embodiment 1.
Figure 10:
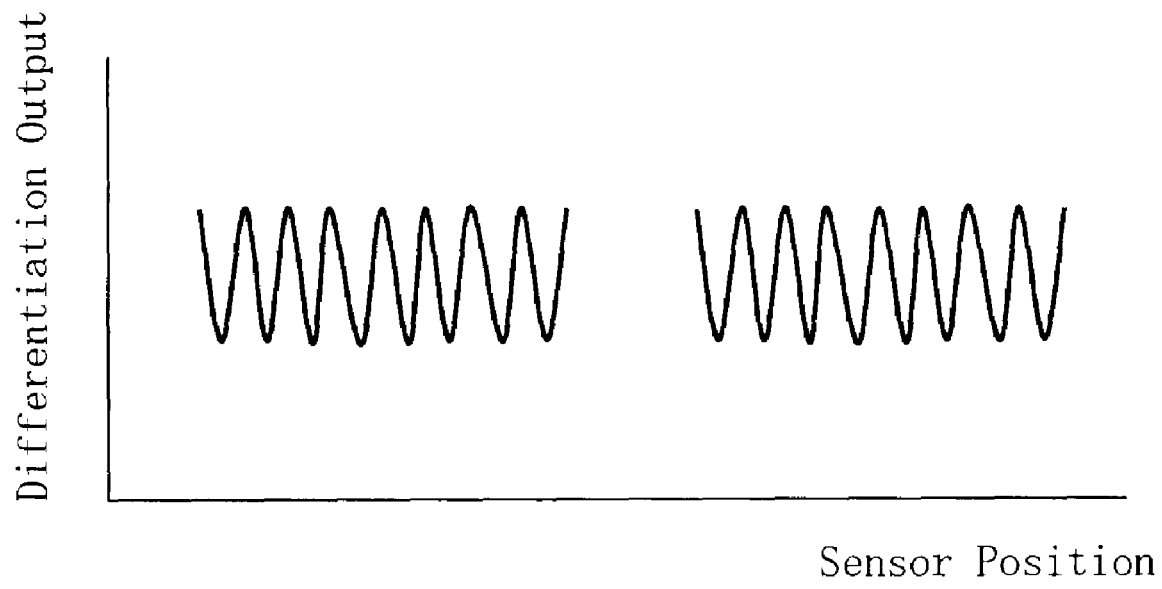
FIG. 10 shows another example of a differentiation output according to Embodiment 1.
Figure 11:
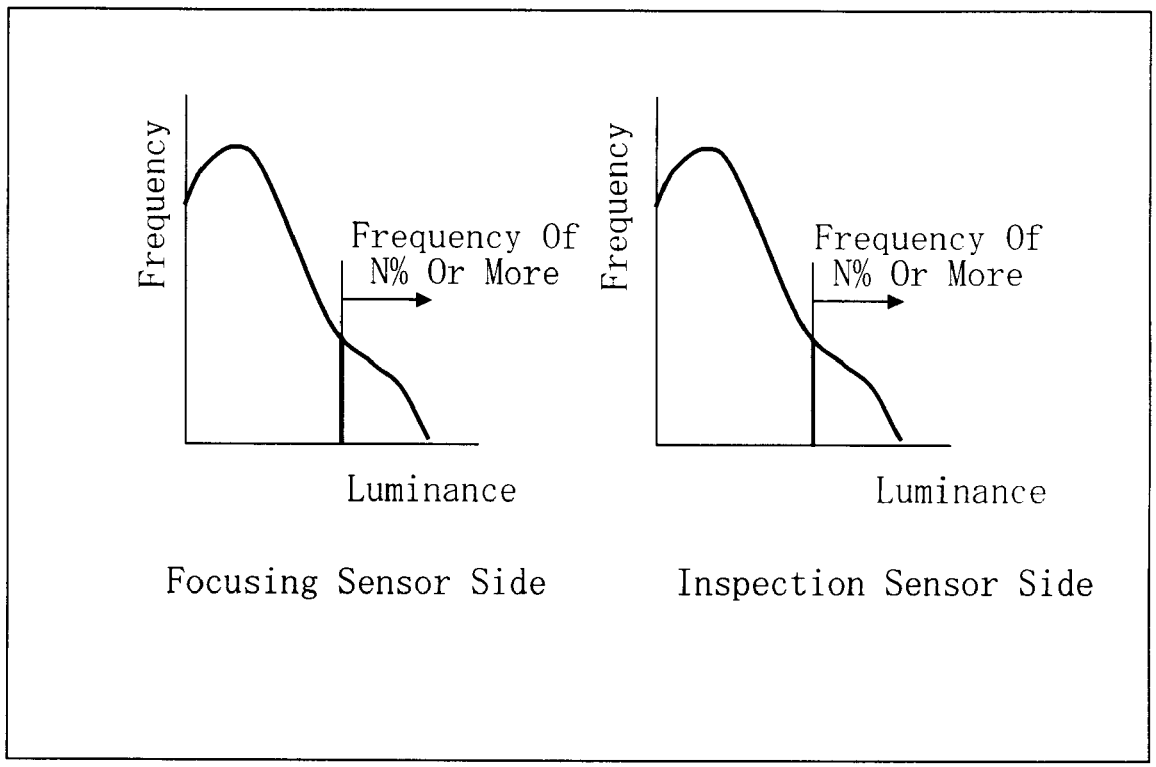
FIG. 11 shows another example of a relation between luminance and frequency according to Embodiment 1.

FIG. 9 shows another example of the sensor output described in Embodiment 1. FIG. 10 shows another example of the differentiation output described in Embodiment 1. FIG. 11 shows another example of the relation between luminance and frequency described in Embodiment 1.

FIGS. 9-11 show the case in which the focus position for forming an image on the inspection sensor 105 is the same as the focus position for forming an image on the focusing sensor 106. In this case, the amplitude of the sensor output of the focusing sensor 106 is equivalent to the amplitude of the sensor output of the inspection sensor 105, and the amplitude of the differentiation output signal of the focusing sensor 106 is also equivalent to the amplitude of the differentiation output signal of the inspection sensor 105. Therefore, the frequency distribution of the differentiation output signal at the focus position of the focusing sensor 106 side is identical to that of the inspection sensor 105 side. In addition, the average value of luminance of frequencies of N % or more of the focusing sensor 106 side is equivalent to that of the inspection sensor 105 side. That is, this position is at the middle point between the just focus position of the inspection sensor 105 and the just focus position of the focusing sensor 106.

Figure 12:
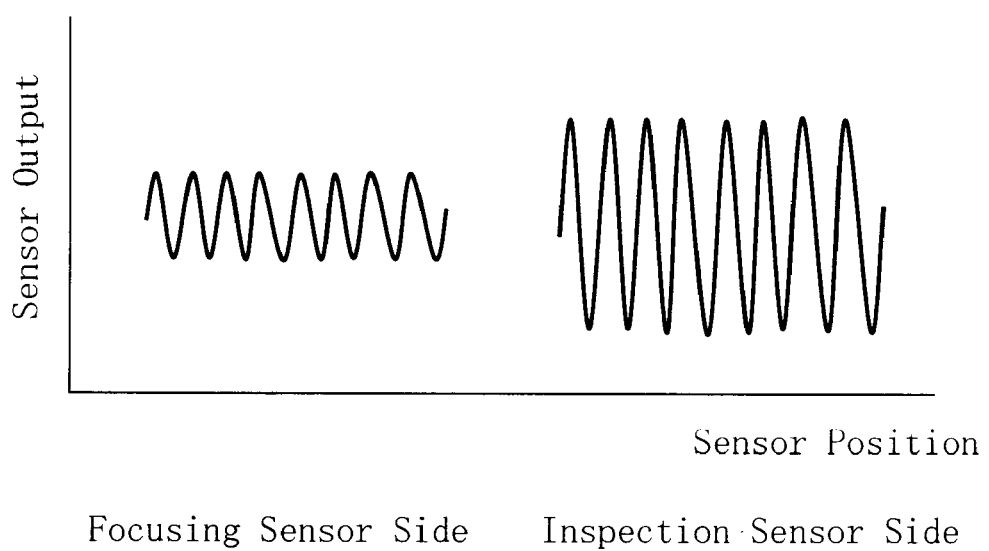
FIG. 12 shows another example of a sensor output according to Embodiment 1.
Figure 13:
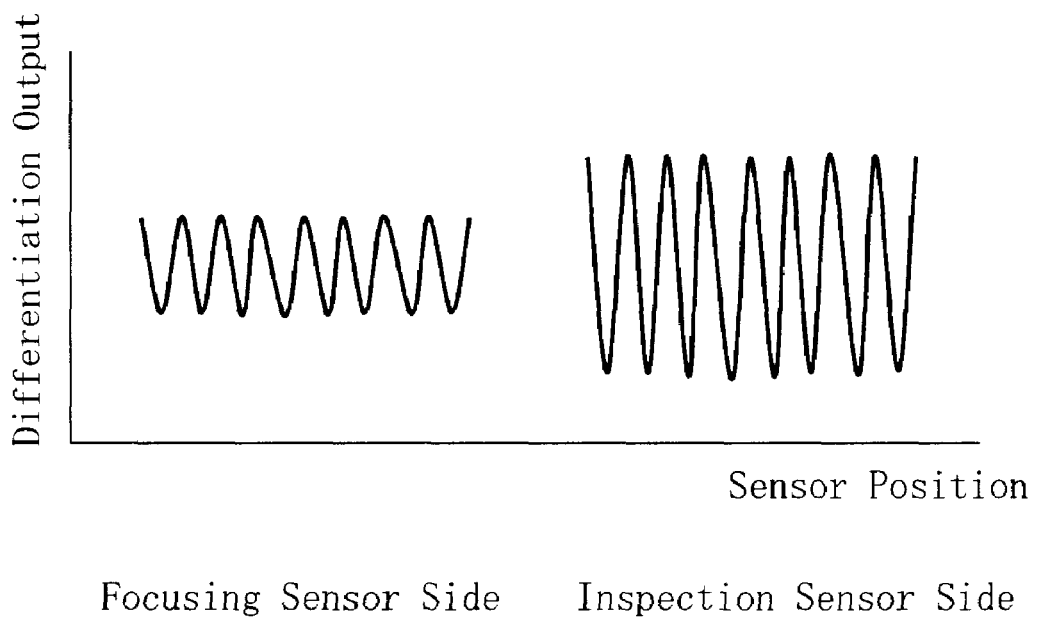
FIG. 13 shows another example of a differentiation output according to Embodiment 1.
Figure 14:
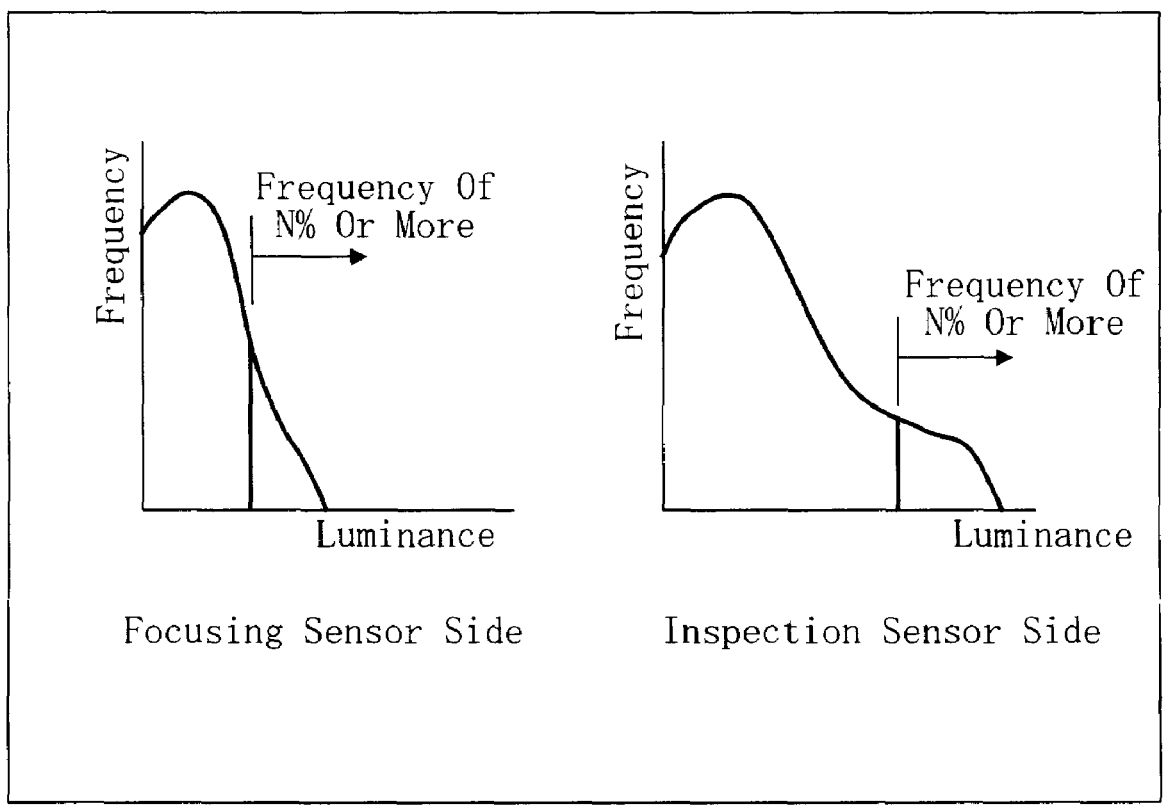
FIG. 14 shows another example of a relation between luminance and frequency according to Embodiment 1.

FIG. 12 shows another example of the sensor output described in Embodiment 1. FIG. 13 shows another example of the differentiation output described in Embodiment 1. FIG. 14 shows another example of the relation between the luminance and frequency described in Embodiment 1.

FIGS. 12-14 show the case in which the focus position of the inspection sensor 105 is at the just focus position. In this case, the amplitude of the sensor output of the inspection sensor 105 is larger than that of the focusing sensor 106, and the differentiation output signal of the inspection sensor 105 is also larger than that of the focusing sensor 106. Therefore, with respect to frequency distribution of the differentiation output signal, the luminance part distribution of the inspection sensor 105 side is larger than that of the focusing sensor 106 side. When calculating the average value of luminance of frequencies of N % or more, the value of the inspection sensor 105 side is larger than that of the focusing sensor 106 side.

Figure 15:
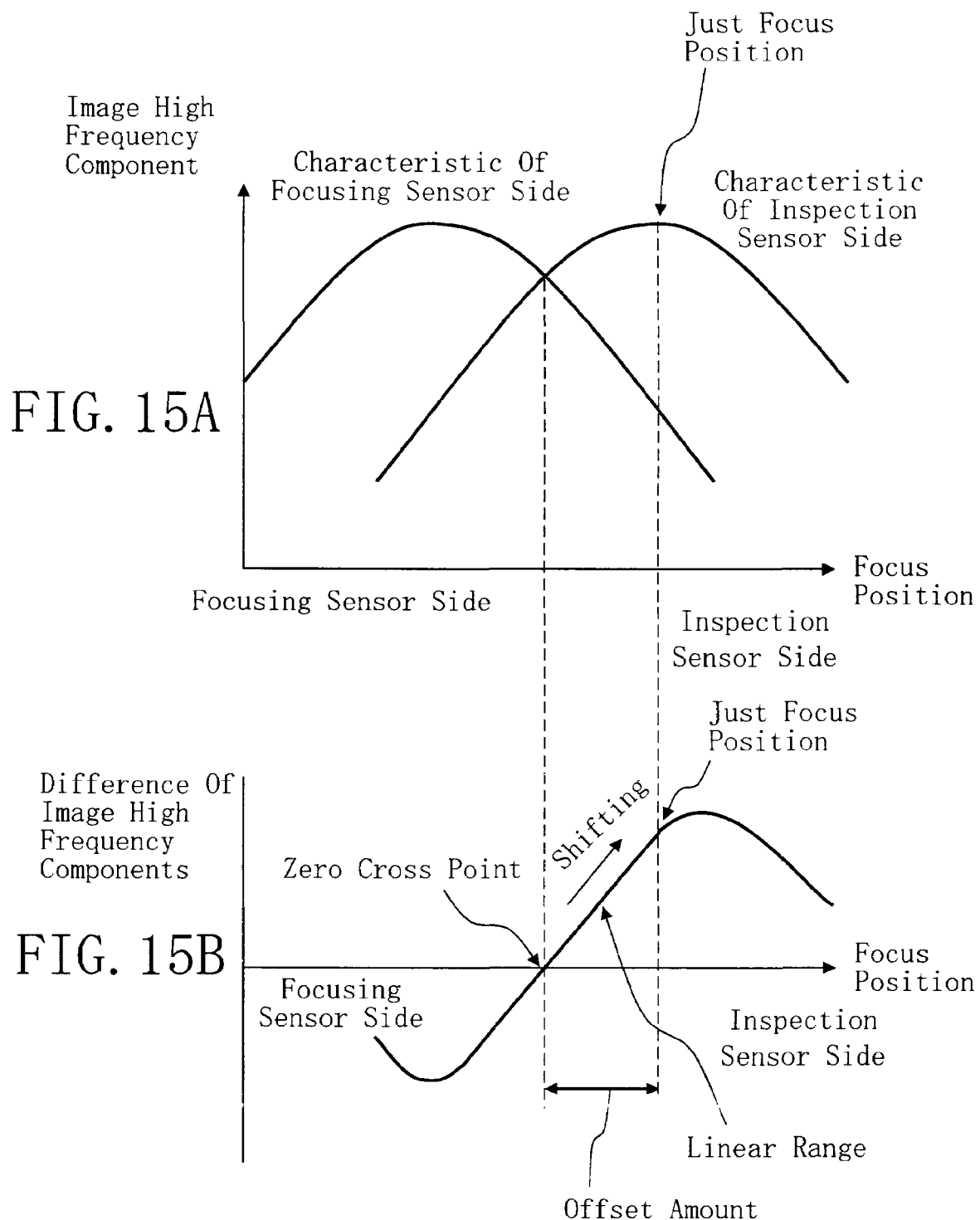
FIG. 15A shows change characteristics of a focus evaluation value, and a difference value obtained by subtracting the focus evaluation value of the focusing sensor side from the focus evaluation value of the inspection sensor side, according to Embodiment 1.
FIG. 15B shows change characteristics of a focus evaluation value, and a difference value obtained by subtracting the focus evaluation value of the focusing sensor side from the focus evaluation value of the inspection sensor side, according to Embodiment 1.

Since the luminance average value of frequencies of N % or more represents a high frequency component of the image and can be an index indicating whether being in focus or not, it is possible to use the luminance average value as a focus evaluation value. FIGS. 15A and 15B are graphs showing a change characteristic of the focus evaluation value, and a difference value obtained by subtracting the focus evaluation value of the focusing sensor side from the focus evaluation value of the inspection sensor side, described in Embodiment 1. FIG. 15A shows change characteristics of the focus evaluation values obtained from the high frequency components of the images of the focusing sensor side and the inspection sensor side, in the case of changing the focus position from the focusing sensor side to the inspection sensor side. That is, when the focus position is at the front focus position, the focus evaluation value at the focusing sensor 106 side is high. Then, in proportion as the focus position shifts to the inspection sensor 105 side, the focus evaluation value at the inspection sensor 105 side becomes high. On the other hand, as shown in FIG. 15B, since the focus evaluation values of the focusing sensor 106 side and the inspection sensor 105 side are equivalent at the middle point of the just focus position of the inspection sensor 105 and the just focus position of the focusing sensor 106, the difference between the focus evaluation values becomes zero. Then, the focus evaluation value changes linearly back and forth relative to the zero cross point being the point of zero. When the focus position shifts to the inspection sensor 105 side over the zero cross point (reference focus position), a monotone increasing output is obtained. When the focus position shifts to the focusing sensor 106 side over the zero cross point, a monotone decreasing output is obtained.

In this case, the just focus position for the inspection sensor 105, at which the focus position is intrinsically to be focused, is the position where the focus evaluation value of the inspection sensor 105 side becomes the maximum as shown in FIGS. 15A and 15B. Generally, the drawing-in range at servo on is desired to be as large as possible. However, this position has a narrow range because the range of the linear relation, meaning a change of monotone increasing or monotone decreasing from the front or back position, is only one side. Therefore, it becomes difficult to highly accurately control the servomotor 162 by the focus control circuit 146.

At the front or back position of the zero cross point, as mentioned above, when the focus position shifts to the inspection sensor 105 side over the zero cross point, an output of monotone increasing is obtained. Based on the difference of the focus evaluation values, it is possible to judge whether the present focus position is at the focusing sensor 106 side or the inspection sensor 105 side. By using the characteristic capable of obtaining a monotone increasing output, it is further possible to judge how much the focus position is shifted from the zero cross point. By performing a servo-on operation at the zero cross point where the range of linearity is wide on both sides, it becomes possible to have a wide drawing-in range at the servo-on operation time, thereby causing the servomotor 162 to operate stably.

By calculating an offset value between the zero cross point and the just focus position for the inspection sensor 105 in advance and by detecting the position of the zero cross point while performing the feedback control, it becomes possible to focus on the just focus position for the inspection sensor 105 when shifted from the zero cross point by the offset value at the time of inspection. Thus, by utilizing the characteristic of monotone increasing, the focus control circuit 146 can highly accurately control the servomotor 162.

As mentioned above, by extracting high frequency signals of image signals of the two sensors and comparing them, even when a critical dimension and a pitch of a semiconductor pattern become below the wavelength of the optical system, the correct focus can be detected and highly precise measurement and inspection can be performed.

Figure 16:
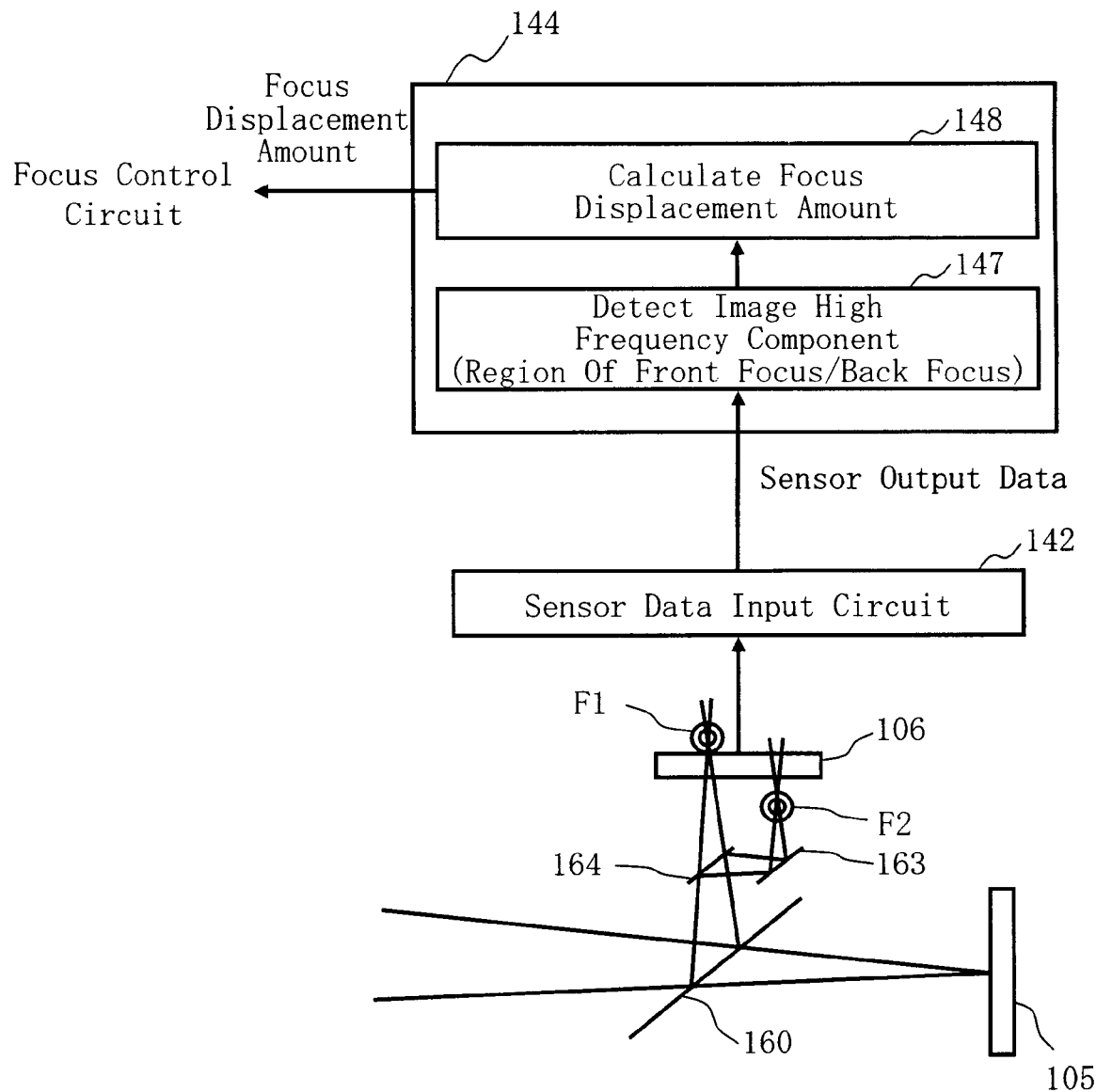
FIG. 16 shows a structure in the case of inputting two image signals of a front focus and a back focus into the focusing sensor and performing an automatic focus adjustment.
Figure 17:
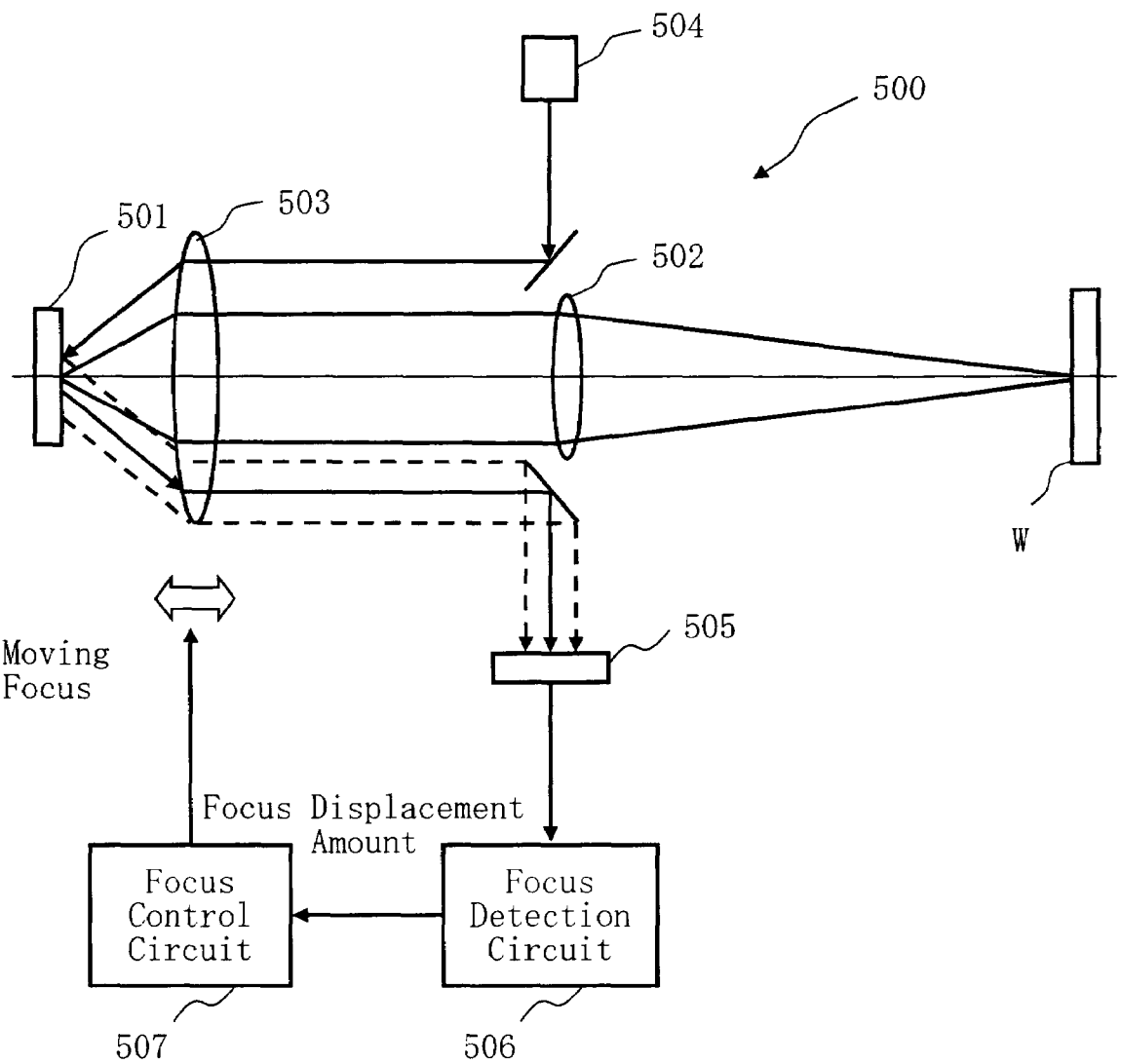
FIG. 17 shows a focusing mechanism in which the conventional optical lever method is applied.

FIG. 16 shows the structure in the case of inputting two image signals of a front focus and a back focus into the focusing sensor and performing an automatic focus adjustment. As mentioned above, by extracting high frequency signals of the image signals of the two sensors and comparing them, it is possible to focus on the just focus position for the inspection sensor 105. Therefore, as shown in FIG. 16, by further branching the optical image, which was branched by the half mirror 160, through a half mirror 164 and a half mirror 163, it becomes possible to focus to be shifted onto the front focus and the back focus of the focusing sensor 106. In addition, a structure is also considered in which focusing on the just focus position can be executed by using a sensor output of the front focus side and a sensor output of the back focus side obtained by shifting the focus position. According to the structure of FIG. 16, it is possible to focus on the just focus position without using the output of the inspection sensor 105. However, in such an optical system, since being branched into three optical images including the optical image for the inspection sensor 105, it results in dividing the inspection light source into three. Then, if it is tried to obtain equivalent dynamic ranges at the inspection sensor 105 side and at the focusing sensor 106 side, the inspection light source is divided into three equally sized according to the structure of FIG. 16. On the other hand, in the focusing mechanism according to present Embodiment 1, since an output of the focusing sensor 106 and an output of the inspection sensor 105 are used, it is enough to divide the inspection light source into two equally sized. Accordingly, it is possible to reduce the light fall from ⅓ to ½.

Moreover, if it is tried to obtain a dynamic range of the original light quantity to be put into the inspection sensor 105 at the inspection sensor 105 side and the focusing sensor 106 side, three times much inspection light source is needed for the structure of FIG. 16. Then, for example, in the case of the inspection wavelength being a 200 nm region, it needs to perform inspection with a light quantity as small as possible so as to suppress degradation of optical components. On the other hand, in the focusing mechanism according to the present Embodiment 1, since an output of the focusing sensor 106 and an output of the inspection sensor 105 are used, twice inspection light source will be enough even in the case of trying to obtain the dynamic range of the original light quantity to be put into the original inspection sensor 105. Therefore, degradation of the optical system can be suppressed.

The embodiment has been described with reference to concrete examples. However, the present invention is not limited to these examples. For example, although the focusing mechanism included in the inspection apparatus for inspecting semiconductor patterns has been explained above, it should be understood that the focusing mechanism mentioned above could also be applied to general optical measurement/inspection apparatuses. Moreover, although the structure in which the focus position to be focused on the focusing sensor 106 as an optical image is shifted to the front side has been explained in the focusing mechanism mentioned above, it may also be shifted to the backside. In that case, as the positional relation of the characteristic positions of the high frequency components becomes reverse, it is possible to focus on the just focus position for the inspection sensor 105 by being shifted to the monotone decreasing direction from the zero cross point by the offset value. Moreover, in the Embodiment mentioned above, although it is structured to move the objective lens by driving the servomotor 162, instead, for example, the photomask 101 may be moved by using a piezo-electric element.

It is to be noted that the present invention is not limited to the above-described Embodiment, but can be variously changed and modified without departing from the scope thereof in an implementation stage. Furthermore, the above-described embodiment includes various stages of the invention, and hence various inventions can be extracted by appropriately combining a plurality of disclosed constituent elements.

Moreover, although description of the apparatus structure, control methods, etc. not directly required for explaining the present invention is omitted, it is possible to suitably select and use some or all of them when needed. For example, while the structure of a control unit for controlling the pattern inspection apparatus 100 is not described, it should be understood that necessary control unit structure could be appropriately selected and used.

In addition, any other focusing apparatus, focusing method, or inspection apparatus that includes elements of the present invention and that can be appropriately modified by those skilled in the art is included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inspection apparatus comprising:
   a first sensor and a second sensor configured to receive an optical image of a target workpiece to be inspected and photoelectrically convert the optical image of the target workpiece;
   a first optical system configured to focus the optical image on the first sensor;
   a second optical system configured to branch the optical image from the first optical system, and focus the branched optical image on the second sensor;
   a focus detection part configured to input first image signals photoelectrically converted by the first sensor and second image signals photoelectrically converted by the second sensor, to differentiate the first and second image signals respectively, to calculate frequency distribution with respect to differential values of the first image signals and differential values of the second image signals respectively, to calculate density averages of frequencies of N % or more respectively, and to detect a focus position of the optical image by using the density averages of frequencies of N % or more as high frequency components of the first image signals and the second image signals;
   a focus control part configured to control a focus of the first optical system based on the focus position detected by the focus detection part; and
   a comparison part configured to compare the first image signals photoelectrically converted from the focused optical image and predetermined reference image signals.

2. An inspection method comprising:
   making an optical image of a target workpiece to be inspected be focused on a first sensor by using an optical system;
   converting the optical image focused on the first sensor photoelectrically;
   branching the optical image and focusing the branched optical image on a second sensor;
   converting the optical image focused on the second sensor photoelectrically;
   inputting first image signals photoelectrically converted by the first sensor and a second image signals photoelectrically converted by the second sensor, differentiating the first and second image signals respectively, calculating frequency distribution with respect to differential values of the first image signals and differential values of the second image signals respectively, calculating density averages of frequencies of N % or more respectively, and detecting a focus position of the optical image by using the density averages of frequencies of N % or more as high frequency components of the first image signals and the second image signals;
   controlling a position for focusing of the optical system, based on the focus position detected; and
   comparing the first image signals photoelectrically converted from the focused optical image and predetermined reference image signals to output a compared result.

3. The apparatus according to claim 1, wherein a magnification ratio of the optical image focused on the first sensor and a magnification ratio of the optical image focused on the second sensor are equivalent.

4. The apparatus according to claim 1, wherein the focus control part controls the focus of the first optical system by shifting the focus to be offset from the focus position detected by the focus detection part by a predetermined value.

5. The apparatus according to claim 4, wherein the second optical system performs focusing onto a front of the second sensor.

6. The apparatus according to claim 5, wherein a position where a difference between the high frequency components of the first image signals and the second image signals becomes zero is used as the focus position.

7. The apparatus according to claim 6, wherein the focus detection part detects the focus position by performing feedback control.

8. The apparatus according to claim 1, wherein the first optical system includes a first lens configured to obtain an enlarged image of the optical image, a second lens configured to make the enlarged image be focused on the first sensor, and a third lens configured to provide a telecentric optical system for an image forming side of the second lens.

9. The apparatus according to claim 8, wherein the second optical system is arranged between the third lens and the first sensor.

10. The apparatus according to claim 1, wherein accumulation type sensors are used as the first and second sensors.

* * * * *